Sept. 5, 1944.    R. W. JENKINS    2,357,472
AUTOMATIC ERRATIC FISH LURE
Filed May 27, 1943    2 Sheets-Sheet 1
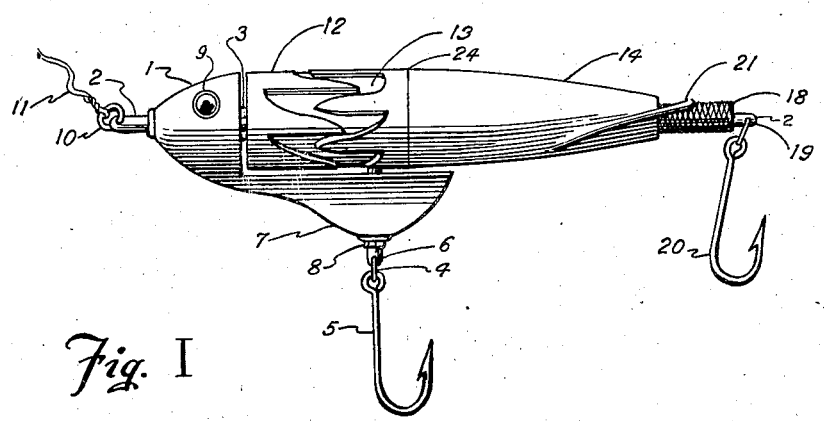
Fig. I
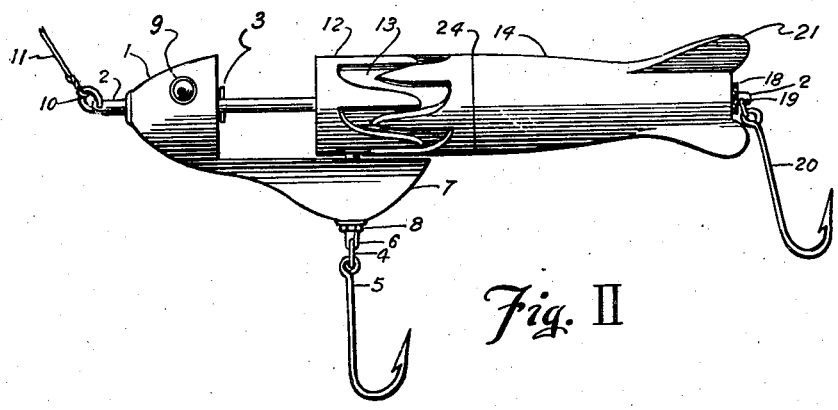
Fig. II
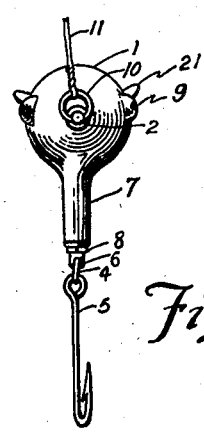
Fig. III
Robert W. Jenkins
INVENTOR.
BY Sept. 5, 1944.  R. W. JENKINS  2,357,472
AUTOMATIC ERRATIC FISH LURE
Filed May 27, 1943   2 Sheets-Sheet 2
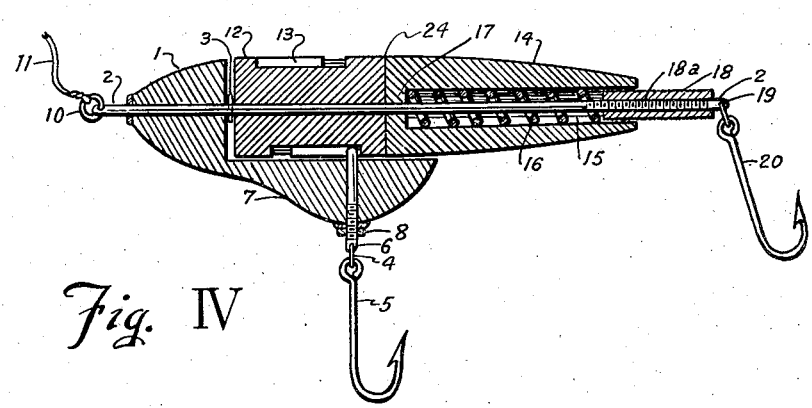
Fig. IV
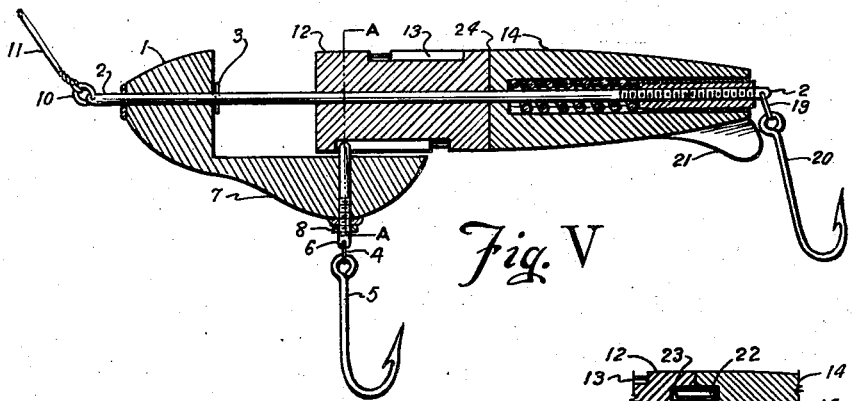
Fig. V
Fig. VII
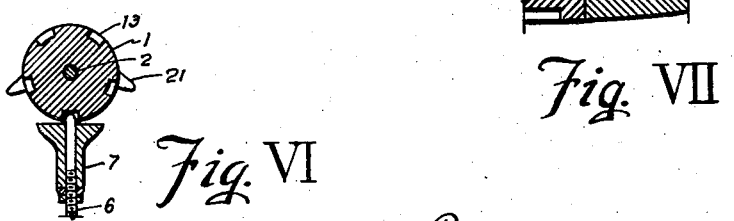
Fig. VI
Robert W. Jenkins
INVENTOR.

Patented Sept. 5, 1944

2,357,472

UNITED STATES PATENT OFFICE 2,357,472

AUTOMATIC ERRATIC FISH LURE

Robert W. Jenkins, Yonges Island, S. C.

Application May 27, 1943, Serial No. 488,675

11 Claims. (Cl. 43—47)

This invention has to do with mechanical fishing lures, and is primarily concerned with a lure which is capable of an infinite variety of movements in the water.

The desire of the ardent fisherman is to present a lure which simulates the movements of live bait; and this device appears to be an animated and living thing.

The primary object of this invention is to provide a lifelike fish lure capable of an infinite variety of movements in the water and which is automatically responsive to any pull by the fisherman upon his line.

There are available a great variety of fish lures which are capable of definite movements in the water, depending on the manipulation of the fish line and particularly the direction of this manipulation.

For instance, there are baits known as spoons. A spoon may be placed in the water with its concave side upward, and the result is that the lure tends to jump out of the water when the line is jerked. When this bait is turned over and the line is pulled, it appears to dive. But in any event, it has a fixed pattern of movement and is not capable of much variation.

There are also baits known as spinners, which bore into the water somewhat like a screw, causing the bait or part thereof to turn over in the water in one direction only.

Other baits have attachments resembling the propellor of an airplane or the screw of a ship, which also revolve in the water. But in all such instances, a fixed pattern of movement by the bait is described again and again, which even to the simplest minded fish should mark the device as an inanimate thing.

Of course, the angler by jerking the line in various directions can give some alteration to the general direction of such mechanical baits; but the movement of a real fish in any direction is almost unpredictable; and this fact has given rise to the present invention.

This invention will present erratic behavior whenever the line is jerked, regardless of the direction of the pull. The merest novice can operate it effectively.

This invention could be with considerable accuracy described as a "scared minnow." It is literally capable of an infinite variety of movements in the water; and there is no fixed pattern successively repeated. Observation of such movements would lead a fisherman to appraise the lure as a living thing.

The lateral rudders on opposite sides of the tail of the lure will cause it to dive or come out of the water or go sideways in the water in something of a wide arc; but other factors in the design and construction of the lure give rise to a multitude of further movements.

By the use of an ingenuous cam arrangement, with a cam pin on the fixed head of the fish and with grooves on a rotatable body, these rudders can be turned to any degree of a circle around the axis of the bait by a simple jerk on the line.

However varied the grooves may be made in the rotor, this would inevitably lead to a generally fixed pattern, even though there were a great number of such grooves and each slightly different in curvature or angulation.

Such fact leads then to the third factor in making the bait erratic and lifelike, which is a further part of the body moved to rotate by a friction clutch capable of slipping.

There are three segments in the body of the bait. The first is the fixed head to which the line is attached and below which a fin is depended and which may carry hooks.

The second segment is the rotor, which turns around a shaft by reason of the grooves in the rotor following the cam pin which is fixed to the first segment so as to extend into these grooves in the second segment.

Now the third segment is the tail piece of the bait, bearing the lateral rudders. There is a frictional surface contact between the rotor and the tail segment. This contact is gently maintained and will allow the rotor section to move more than the tail piece in describing a partial revolution about the axis common to both, and it will also permit equal movement.

Depending on the suddenness with which the fish line is jerked, which to some measure determines the firmness of the friction surface contact, the two movable segments of this bait will describe their separate partial rotations to varying extents. In fact, the relative position of the rudders toward any particular groove or part thereof on the surface of the rotor can be varied by as many degrees or fractions thereof as may be found in a circle. In other words, the relative positions maintainable between these parts is infinite.

This means that the movement of the bait is largely unpredictable; one jerk of the fisherman's line gently made will cause a certain movement, whereas a sudden strong jerk would have produced a different movement; and a few successive pulls on the line will cause the bait to dive, swim sideways or come out of the water in various arc-like movements.

No particular form is required in making this lure. It is only necessary that a cam operated and rotatable body or segment thereof be provided; and a further friction controlled segment may be supplied.

However, a satisfactory form of construction is indicated in the accompanying drawings, in which:

Fig. I is a side elevation of the lure in repose.

Fig. II is a side elevation of the lure the moment after the fish line is jerked.

Fig. III is a front elevation of the lure.

Fig. IV is a sectional view along the line of the rod while the lure is in repose.

Fig. V is a sectional view along the rod when the lure is in extended position.

Fig. VI is a cross-sectional view, taken along the line A—A of Fig. V.

Fig. VII is a cross-sectional view of parts of the rotor and tail piece, showing how they may be held in alignment with the use of a loose pin.

In the drawings the numeral 1 indicates the head piece or first segment of the fish lure, which in the example given has the general appearance of a small fish; but it must be understood that any other form may be used, and that other forms have been used and found satisfactory.

In this invention, whatever form the lure is given, it is provided with a head segment 1, mounted on a shaft 2. It may be loosely mounted on this shaft, as appears in the drawing, in which case a pin 3 may be made fast through the shaft to prevent the backward movement of head 1.

There is a better movement and a further simulation of a swimming fish if the head is allowed to be loosely mounted on shaft 2; and such mounting is preferred but not necessary.

When head 1 is mounted on shaft 2, it is to be observed that the greater weight of this head is below the shaft, so as to keep the head upright. This position is further maintained by the ventral fin 7.

Ring 4 is loosely fixed through cam pin 6, and is adapted to carry the fish hook 5. This pin is threaded at its lower end and is screwed through the fin 7 depending from the head of the fish; and it has a lock nut 8 so that the depth of penetration through the fin may be fixed and the pin held firm at this exact penetration.

Eyes 9 and other decorations may be placed upon the fish. The fish shown in the drawings is merely illustrative of the device and is intended primarily to disclose the mechanics employed to operate the bait.

The ring 10 is movably mounted in an eye through the front end of the shaft 2; and this ring carries the fishing line 11; and a pull upon this line will cause varied and erratic movement by the lure, as further explained.

The second segment of the lure is a substantially cylindrical body 12 mounted upon and disposed about the shaft 2, so that it may rotate thereon; and this segment will be called the rotor. It will also slide along the shaft 2.

On the outer surface of the rotor 12 are disposed grooves which react in connection with the cam pin 6 to cause irregular movement and intermittent action of the rotor. These grooves which are designated as 13 may be made in an infinite variety of patterns; but it is desirable that they be so carved upon the face of the rotor as to cause the rotor to turn upon the movement of these grooves along the rounded upper end of the cam pin 6.

In the drawings the rotor grooves 13 are substantially the same in design; but it is to be understood that they may be varied, especially in the angles of inclination where two grooves meet to form a turning point. It is preferred, however, that these grooves have alternate walls of first curved character and then of substantially straight design. But the net result of the cam action between the grooves and the cam pin is to cause the rotor section of the lure to turn; and the disposition of these grooves may be such that the turning will be either clockwise or counter-clockwise.

The third and last segment of the lure is the tail section 14, which is mounted upon the shaft 2 so that it may revolve therearound. It will also slide along the shaft.

A hole 15 is made through tail section 14 to carry shaft 2; but this hole is made much larger than the shaft. It is made sufficiently large to carry a coil spring 16 within the opening of the hole and around shaft 2. There is a stop 17 in the forward part of segment 14 against which the end of coil spring 16 comes to rest within such segment.

A knurled nut 18 is adjustably mounted, preferably by the use of threads 18a, on the rear end of shaft 2, and so disposed as to contain the spring 16 within the hole 15, which provides a housing for the spring. This knurled nut 18 can be screwed backward or forward upon shaft 2 to regulate the tension of spring 16; and this spring normally remains in extended position around shaft 2. The extreme rear end of shaft 2 carries the ring 19, to which may be attached hooks 20.

Extending laterally from the outside of the tail section 14 will be found one or a plurality of lateral rudders 21. They are disposed in angular relation to the shaft 2; and they may be slightly concave in design. In any event, they are so shaped as to have an elevating or lowering effect or a lateral effect, or a combination of such effects, upon the direction of the lure when it is drawn through the water. Any variety of conditioning dispositions may be utilized in designing and affixing a rudder. They account for the lateral movements and diversions of the lure as it is drawn through the water.

The rear face of rotor segment 12 may be finished to present a flat circular face; and the forward end of tail segment 14 may be likewise so finished; and these two faces together form a "friction clutch" 24.

When the lure is drawn through the water, the rudders impart to it lateral movements which are usually described in a broad arc. However, a quick jerk upon the line 11 will cause the cam mechanism, comprised of cam pin 6 and grooves 13, to turn the rotor 12; and such turning will also cause the tail section 14 to turn; but the turning of the latter may not always be to the full extent that the rotor turns because of the action of the friction clutch 24. This means that as regards any particular point in the groove, a rudder may be disposed therefrom at any degree of a circle described around shaft 2; and this results in an infinite variety of positioned relations between the rudders and the rotor.

Likewise, this allows for an innumerable number of variable dispositions between any three given points on the three segments of the lure.

Irregular and intermittent movements of the lure as a whole then result from successive pulls on the fishing line; and these movements are further influenced by the speed and power of such pulls; and a further influence results from a quick succession of pulls as opposed to a single pull.

It is to be noted that the force of inertia is employed to momentarily overcome the spring tension and cause the head piece of the lure to move forward faster and more promptly than the rotor and tail piece whenever the fish line is pulled. This permits the operation of the cam which turns the rotor; and the rotor in turn is followed by the tail piece carrying rudders. The rudders direct the forward movement.

Of course, the second and third segments indicated above and in the drawings can be made in one piece; and the mechanical principles are the same, except only that the movements of the bait are not so varied.

Likewise, the middle or rotor segment may, for the day's fishing, be firmly fastened to the tail segment with the use of a pin common to both, as by pin 22 in hole 23 (or by other attachment means), so that a particular form of movement by the lure which has been found successful for a particular kind of fish sought may be repeated at the pleasure of the fisherman.

Much the same result can be accomplished by tightening spring 16 to complete compression.

In operation this fish lure reacts as though it were really live bait; and quick jerks upon the fish line will cause it to move through the water as though it were a frightened fish. The naturalness of movement and the unpredictable direction and extent of movement makes this lure a very practical and attractive fish bait.

Varying the tension of the spring 16 by screwing in or out the knurled nut 18 will further condition the movement of the bait. When the spring is screwed up into very close compression, a much stronger jerk of the line is required to make the rotor work than when the spring is relatively loose; but when the spring is tight, the reaction and turning movement of the rotor and tail segment of the lure is much quicker.

Once this device is properly adjusted, especially as to the spring 16 and as to the cam pin 6, there is nothing about it to get out of order; and when made of proper and suitable materials, it has a very long life and is practically indestructible.

Suitable colorings and other attractions may be used to finish the surface of this lure to make it a more inviting bait for fish.

With a little practice, the fisherman soon learns that in addition to the automatic directional effects of the cam motion and the response of the variously adjusted rudders, other movements of the bait through the water can be initiated in various directions by the angle at which the line is held when fishing and the tautness thereof. A slack line results in movements unlike those responding to a tight line. An elevated line brings responses which differ from the low line effect.

Likewise the fisherman may influence the movement of his lure by jerking his line repeatedly. Practice soon lends accomplishment in the use of this lure; and with it an experienced fisherman, after a little practice, greatly increases his catch and also his enjoyment of fishing.

Yet, without any practice at all, an amateur or lazy fisherman can enjoy the automatic and erratic movement of this bait by simply making intermittent pulls upon his line; and the alert and hungry fish will do the rest. This is essentially an automatic and a very erratic fishing lure.

I claim:

1. In a fishing lure, a head segment; an intermittently rotatable segment; and cam means associated with both segments for effecting partial rotation of the second named segment when the first is drawn through the water.

2. In a fishing lure, a shaft; a head segment mounted thereon; a rotatable segment mounted behind said head segment and on said shaft; and a tail segment mounted on said shaft and adapted to communicate with the rotor segment by frictional engagement.

3. In a fishing lure, a shaft; a frontal segment mounted about said shaft; a cam pin carried by said frontal segment; and a segment in the rear of the frontal segment and rotatably mounted on the shaft and having grooves in the surface thereof adapted for engagement with the cam pin.

4. In a fishing lure, a plurality of segments mounted upon and disposed about a shaft; cam means adapted to effect intermittent rotation of one such segment about the shaft; and another rotatable segment formed to extend lateral rudders outwardly near its tail end.

5. In a fishing lure, a shaft adapted for attachment to a fishing line; a forward segment of the lure affixed to and about the shaft; a grooved segment and a tail segment both rotatably mounted upon the shaft; spring means for normally keeping all three segments in close contact relation; and cam means for rotating the grooved segment when the finishing line is jerked.

6. In a fishing lure having a head part, a shaft; a rotatable median section and a rotatable tail section mounted on the shaft; means for the frictional engagement of the two rotatable sections adapted to allow the tail section to rotate less than the median section when the latter is turned; and cam means for intermittently rotating the median section.

7. In a segmented fishing lure, a shaft carrying the segments; an anterior segment mounted on the shaft; a posterior segment having lateral rudders and slidably mounted on the shaft; a median segment slidably mounted on the shaft and adapted to rotate thereon, said median segment being provided with an irregular surface groove therearound; a pin carried by the anterior segment and adapted to articulate with the groove to effect the rotation of the median segment when the latter is moved along the shaft; and spring means adapted to normally maintain contact between the segments, and further adapted to allow the median and posterior segments to slide along the shaft momentarily as a result of the force of inertia when the anterior segment is suddenly drawn forward through the water.

8. In a fishing lure, a shaft; a head segment on said shaft and carrying a cam pin; a rotatable cylindrical segment on said shaft and having an irregular surface groove therearound adapted to articulate with the pin; a tail segment on said shaft and carrying rudder extensions; and spring means adapted to normally keep the two first named segments in close relation, and further adapted to allow the two last named segments to momentarily slide backward upon the shaft when the head segment is drawn forward in the water.

9. In an automatic fishing lure, a head piece; a cam pin carried by said head piece; a shaft carrying the head piece; a second piece having a substantially cylindrical surface provided with an irregular groove therearound adapted to articulate with the cam pin, the second piece being rotatably and slidably mounted on the shaft; lateral rudders on the second piece; and spring means normally maintaining both pieces in close relation but adapted to allow the second piece to slide backward momentarily on the shaft when the head piece is drawn forward through the water.

10. In an automatic fishing lure, a shaft; a rotatable and slidable member mounted thereon, such member being provided with a laterally extended rudder; spring means adapted to cause the intermittent movement thereof along the shaft; and cam means adapted to cause the intermittent rotation thereof about the shaft.

11. In a fishing lure, a shaft; a pair of rotatable and slidable members mounted thereon; cam means adapted to rotate such members about the shaft; clutch means adapted to cause the rotation of one member to a less degree than that of the other; and manual means for fixing equal rotation thereof.

ROBERT W. JENKINS.